April 30, 1963 H. L. SMITH, JR 3,087,652
HIGH-SPEED FEEDING AND DIVIDING APPARATUS
Filed March 30, 1960 3 Sheets-Sheet 1
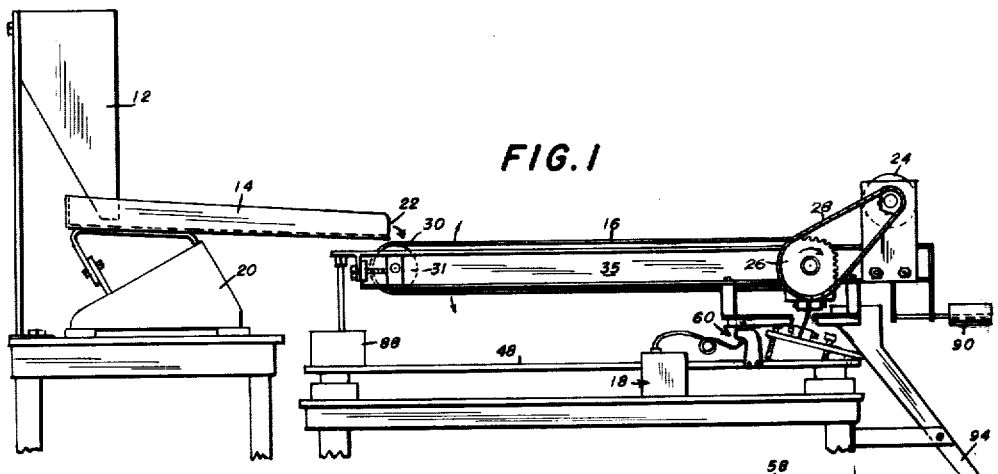
FIG. 1
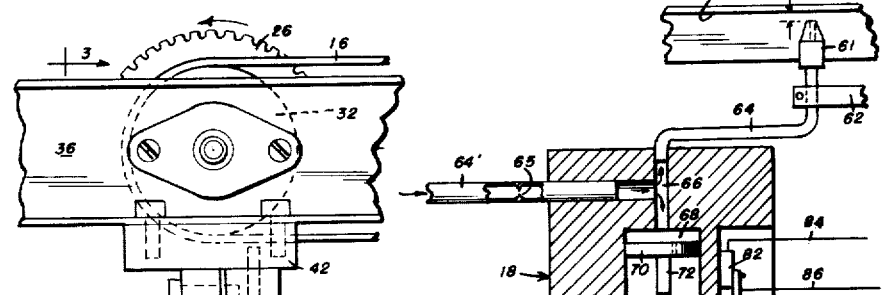
FIG. 2 FIG. 5
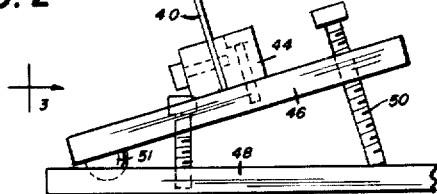
FIG. 3
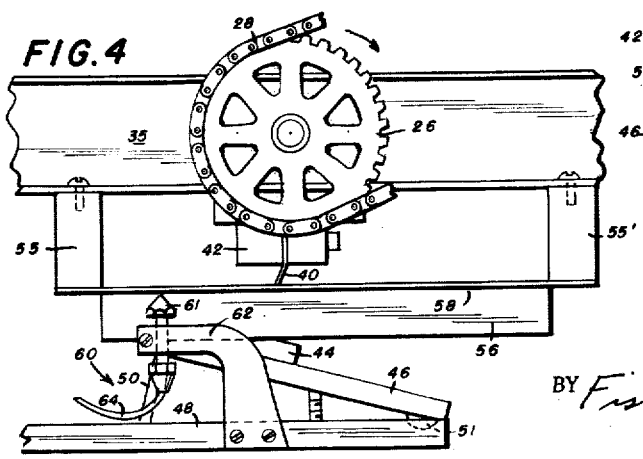
FIG. 4
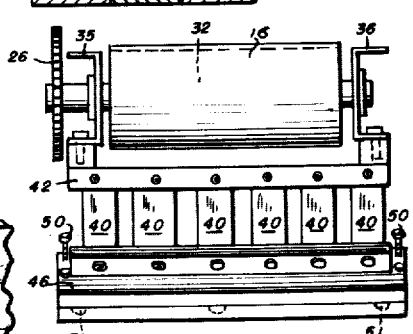
INVENTOR
HORACE L. SMITH
BY *Fisher Christen & Goodson*
ATTORNEYS April 30, 1963 H. L. SMITH, JR 3,087,652
HIGH-SPEED FEEDING AND DIVIDING APPARATUS
Filed March 30, 1960 3 Sheets-Sheet 2

INVENTOR
HORACE L. SMITH

BY Fisher, Christen & Goodson
ATTORNEYS

INVENTOR
HORACE L. SMITH

United States Patent Office 3,087,652
Patented Apr. 30, 1963

3,087,652
HIGH-SPEED FEEDING AND DIVIDING
APPARATUS
Horace L. Smith, Jr., Richmond, Va., assignor, by mesne assignments, to Hupp Corporation, a corporation of Virginia
Filed Mar. 30, 1960, Ser. No. 18,671
12 Claims. (Cl. 222—55)

This invention relates to a mechanism capable of dividing a granular mass into equal weight increments with extreme accuracy and at high speeds.

Most governmental regulations (and the dictates of sound commercial practices) require that material, granular foodstuffs in particular, be packaged and labeled in units of weight rather than volume. Volumetric labeling would oftentimes be meaningless because of the variance caused by moisture content and/or the size of the individual grains. However, volumetric measuring has been found to be most economical for use with high-speed packaging operations. For instance, in many operations, it has been found to be more advantageous from a cost viewpoint, to use high speed volumetric measuring with its inaccuracies and placing a constant amount of extra material in the packaging containers, so that this extra volumetric amount will satisfy any variations in the weight per volume characteristics of the packaged material. This will insure that the labeled minimum amount of material will always be found in the container. It is therefore an important objective of this invention to reduce this unnecessary expense to a packaging agency by setting forth structure which will be fast enough to work with modern packing operations and accurate enough to insure that minimum weight requirements are consistently satisfied.

The general combination of the weighing conveyor assembly of this invention is known to the prior art. The general combination includes a variable-speed hopper by which a stream of material is fed to a constant speed hopper by which a stream of material is fed to a constant speed endless belt conveyor, which conveyor is supported on a mounting permitting movement from a normal position depending on the weight of material thereon; a means for detecting this movement; and a means for changing the detected movement to a signal capable of varying the feed rate from the hopper. One of the more important objectives of this invention is to provide an air pressure detecting arrangement for use within this combination which is continuous, rather than intermittent in operation.

Another important objective of this invention is in the provision of division means which are used effectively when extremely accurate amounts of weight per unit length on a conveyor is known to exist.

A still further objective of this invention is to provide machinery which will speedily accurately conduct a packaging operation wherein the material to be packed is computed by weight rather than by volume.

A still further objective of this invention is to provide a conveyor with novel mounting means at one end thereof, so that the conveyor's normal posture will be affected by the amount of granular material thereon. The mounting means is resilient, rugged and easily adjusted to permit the conveyor to pivot such that a pressure sensitive detecting means may detect the slightest pivoting motion in the conveyor assembly.

A still further objective of this invention is to provide a novel take-off assembly for use in association with the weight per length feed conveyor whereby a per time ratio in the take-off will result in the correct weights of material being fed to the packaging containers.

A still further objective of this invention is to provide a second embodiment of a take-off means for use with the feed conveyor of the type described, wherein a plurality of camming arms are utilized to discharge the proper length-increment of the granular material from a circular path of constant weight per length of material.

Further objectives of this invention will be apparent from a reading of the following specification taken, in conjunction with the accompanying drawings in which:

FIG. 1 is a diagrammatic elevational view of the mechanism of this invention;

FIG. 2 is an enlarged side elevational view of the resilient mounting;

FIG. 3 is a sectional view taken along the line 3—3 of FIG. 2;

FIG. 4 is a view showing the conveyor movement detecting mechanism;

FIG. 5 is a partly diagrammatic, and partly schematic view showing the operation of the detecting mechanism;

Figure 6:
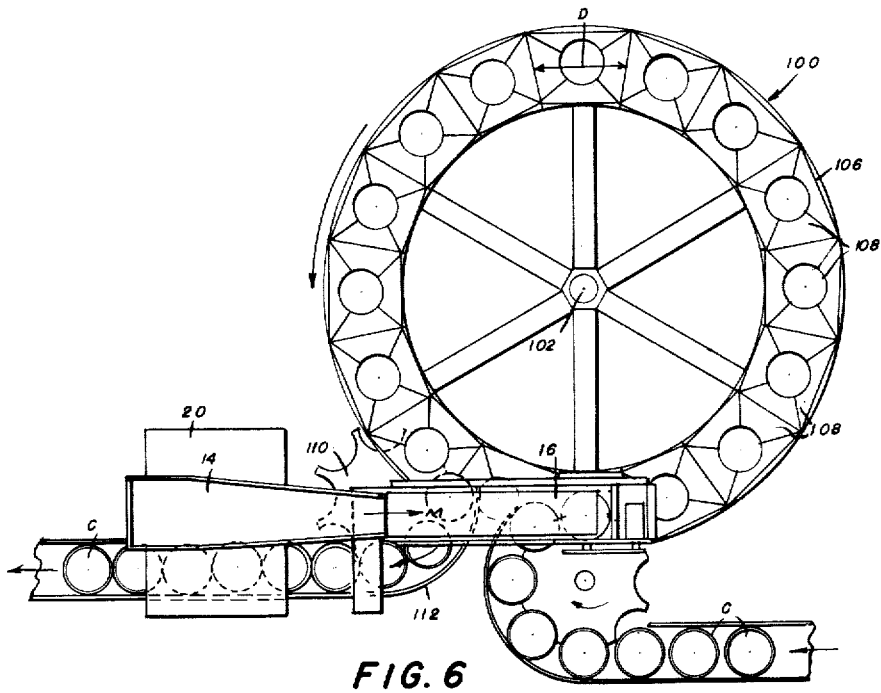
FIG. 6 is a diagrammatic plan view of one form of take-off assembly.

Referring now to the drawings where like numerals indicate like parts, the numeral 10 designates the weighing-feeding assembly of this invention. The assembly is comprised generally of a storage hopper 12, a vibrating feeder hopper 14, an endless belt conveyor 16 and a pressure detecting mechanism 18.

The storage container 12 feeds a granular material to a vibrating hopper 14 in a conventional manner. The amount of granular material which is fed from vibrating hopper 14 to the conveyor 16 is controlled by the degree of vibration present in the hopper. The hopper and its vibrating mechanism per se are not within the scope of this invention. The vibrating mechanism is designated by numeral 20 and is positioned directly below hopper 14. As can be seen best in FIG. 1, the dispensing end 22 of the hopper 14 is positioned above the receiving end of the endless conveyor belt 16. The end 22 is not in contact with the conveyor. As the conveyor 16 rotates at a constant speed, it can be seen that a uniform layer of granular material will be deposited along the conveyor belt, as long as the rate of discharge from hopper 14 remains constant.

The conveyor belt is operated by a suitable synchronous motor 24 driving the sprocket 26 through the drive belt 28. The conveyor belt is supported at its receiving end by a floating roller 31, and at its discharge end by a driven roller 32. The roller 32 is driven by sprocket 26 to which it is affixed. The receiving end of the conveyor is designated by the numeral 30.

The conveyor assembly and motor 24 are wholly supported by a framework 36. This framework consists principally of a pair of elongated parallel U-beams 35 and 37 to which rollers 31 and 32 have been journaled. A suitable bracket 23 is attached to the framework to support motor 24.

A clamping block 42 extends between members 35 and 37 and is secured thereto by any conventional means. The clamping block is adapted to secure to the framework 36, the upper ends of a plurality of leaf springs 40. These springs form the main support for the framework 36 and the superstructure attached thereto, and will permit the framework to deflect vertically to an off normal position when the weight of the material on belt 16 is varied.

The lower ends of leaf springs 40 are clamped by a screw and block arrangement designated by the numeral 44. The block rests on an inclined board 46, which is in turn supported by the main horizontal table support 48. The inclined board 46 threadedly receives a plurality of adjusting screws 50. These screws are normal to the board and have their ends resting against support 48. The board 46 also has an adjusting screw 52 at an angle therethrough and normal to the table support 48. As best seen in FIG. 2, the posture of the conveyor assembly may be adjusted by the position of these screws in board 46. By having the spring 40 at an inclination with respect to the conveyor, there is always some compression in the spring which will aid in giving uniformity to the pivotal movements of the conveyor. Hinges 51 secure the inclined board to the table support.

Rigidly attached to the frame 36 by depending members 55 and 55' is an L-shaped member 56 having a horizontal flange 58 extending outwardly therefrom. Spaced directly below the flange 58 is a pressure sensitive device 60. The conveyor frame assembly is so adjusted by varying springs 40 that the flange 58 is just out of contact with a pressure sensitive device 60 when a proper stream of material is on the conveyor.

*Detection Device*

The operation of the detecting device is best seen by referring to FIG. 5. The hose 64' supplies pressure at a constant rate to the detecting and relay box 18. The air is then transferred by hose 64 to nozzle 61 to impinge on flange 58.

At the point of juncture between lines 64 and 64', a channel 66 communicates the air lines with an air cylinder 68. Slidably secured within the air cylinder is a piston head 70 having a spring mounted piston rod 72 depending therefrom. The piston is adapted to move within the cylinder in response to the pressure existing in channel 66. As the pressure in 66 increases due to plate 58 approaching the nozzle 61, the piston will move downwardly. Likewise as plate 58 leaves the vicinity of the nozzle, the piston will move upwardly.

Along the surface of rod 72, there is formed a rack 74 adapted to mate with a pinion 76. A transfer rod 78 has one end thereof attached to the pinion and its other end attached to arm 80 of potentiometer 82. The signal from potentiometer 82 is sent to the vibratory mechanism 20 via electrical connections 84 and 86, in a manner well known to those skilled in the art. This signal is adapted to control the vibration energy available to the vibratory mechanism 20.

The piston head 70, if desired, may be manufactured of a flexible material, and have its periphery affixed to the cylinder wall. This will permit the same lineal movement of rack 74 which is permitted by the disclosed embodiment.

Therefore it can be seen that the correction signal sent to the hopper is continuous in operation. There is no intermittent or "off and on" operation permitted. The slightest deflection in flange 58 almost instantaneously sends a correction signal to mechanism 20. The air pressure detector is extremely sensitive and allows very accurate settings to be transferred to rheostat 82. This accuracy cannot be obtained from straight electrical transfer means alone unless manufactured at excessive cost, and with a sacrifice in ruggedness and performance.

A conventional damping mechanism 88 connects the receiving end of conveyor 16 and the main supporting framework. This mechanism will dampen any spurious or unwanted deflections of the conveyor which do not indicate a true error in the amount of feed being dispensed. A counter-pulse weight 90 along the extension of the conveyor assembly is laterally adjustable and permits fine adjustment of the conveyor posture after the initial adjustment of the conveyor has been made to springs 40.

A conventional funnel chute 94 is placed below the dispensing end of the conveyor to transfer the stream of material of constant weight to the dividing mechanism.

*Weight Dividing Apparatus*

Figure 7:
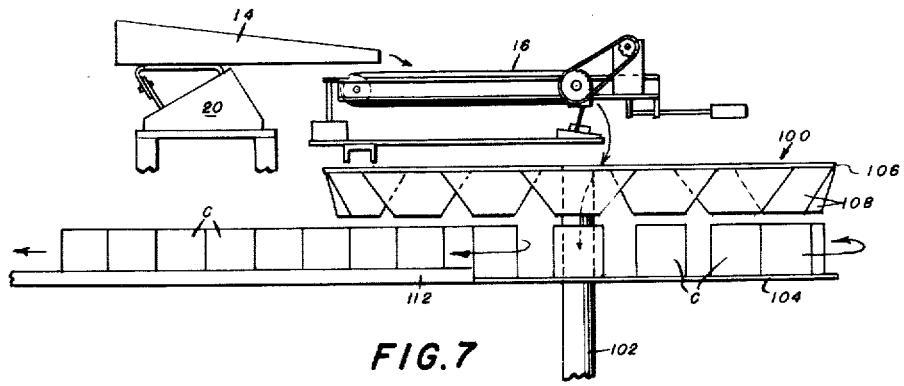
FIG. 7 is an elevational view thereof.

FIGS. 6 and 7 disclose a feed mechanism which will rapidly convert the accurate weight per length stream of material which leaves the belt conveyor, into packageable unit increments. As described above, the stream of material along the conveyor assembly moves at a constant rate and has an accurate constant weight per unit of length. The apparatus hereinafter described provides structure which divides the stream into equal lengths and consequently into the equal weight increments.

The mechanism of FIGS. 6 and 7 is comprised generally of a turret assembly 100 having a rotating staff 102 which supports a circular container receiving platform 104, and a second platform 106 comprised of a circular array of funnels 108 spaced above the container receiving platform.

A conventional guide, and starwheel-feed continually place empty open-topped containers C on platform 104. Guide and stop members (not shown) may be supplied to platform 104 to insure that each can will be accurately placed beneath one of the funnels 108.

The platforms 104 and 106 each rotate with shaft 102. The shaft is set to rotate at an adjustable uniform speed. With the funnel width D known, and the weight of the material known which will leave the conveyor in the time it takes D to traverse beneath the dispensing end of the conveyor, it can easily be seen that uniform amounts of material will be rapidly deposited in each can with very little chance of error occurring. A conventional take-off wheel 110 removes the filled cans after they have reached a point adjacent guide 112. Each funnel, in effect, divides rate by time giving a quotient of a length increment. Each length increment is deposited in a container and has a pre-determined weight.

Figure 8:
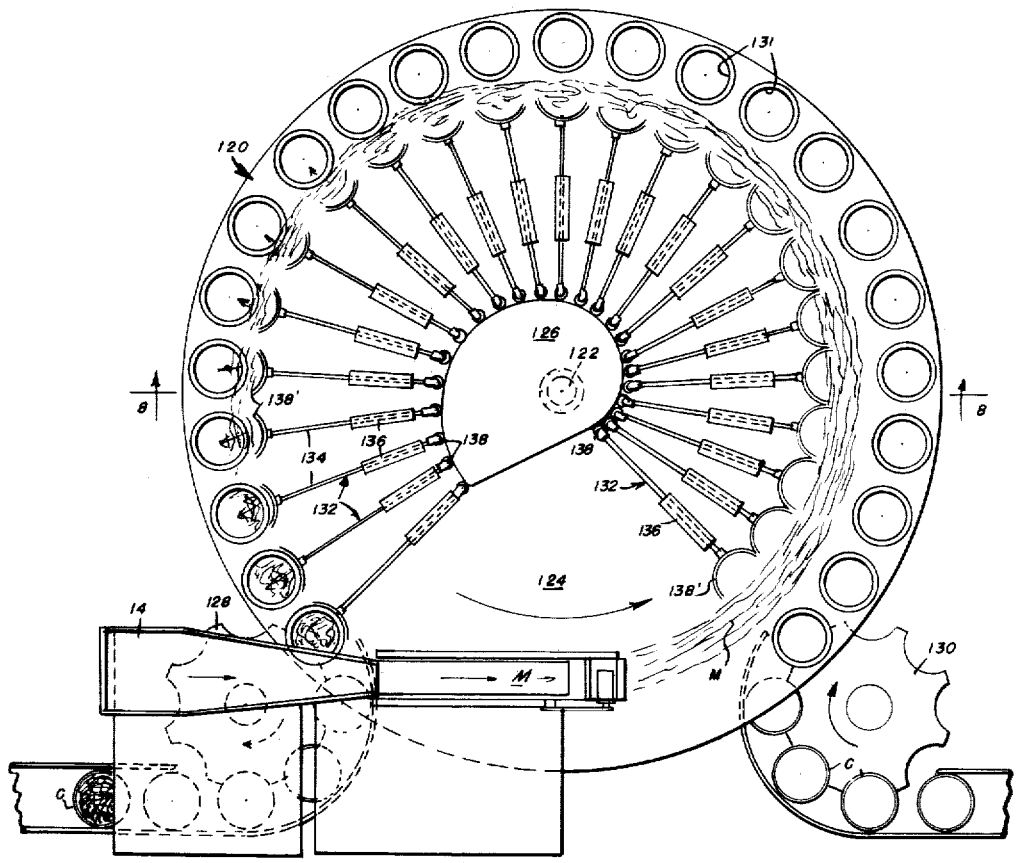
FIG. 8 is a diagrammatic plan view of a second form of take-off assembly.
Figure 9:
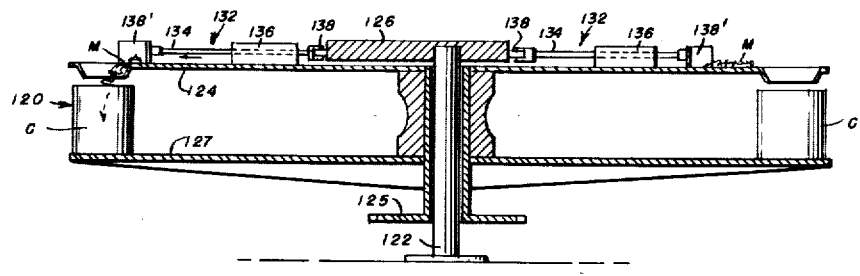
FIG. 9 is an elevational view thereof.

The divider shown in FIGS. 8 and 9 serves the same purpose as the structure of FIGS. 6 and 7, but obtains its objective in a different manner. The turret of this feeder is generally designated by the numeral 120. A fixed standard 122 having a fixed cam 126 rigidly secured thereto, supports the rotating platforms 124 and 127. A sprocket 125 is attached to the platforms, and is connected to a suitable power means so that the turret is driven at a constant speed.

The platform 127 and its associated feed and take-off starwheels 128 and 130 are similar to their like components in the structure of FIGS. 6 and 7. The upper platform 124, however, is substantially different. The platform is a substantially solid disc, with the exception of discharge openings 131 arranged about the periphery thereof. Mounted on the upper surface of platform 124, inwardly of each of the openings 131, are a plurality of discharge assistants 132. These discharge assistants are each comprised of a rod 134 slidably received in an associated guide 136. At one end thereof, a roller 138 engages cam 126, and at the other end thereof is a cup-shaped pusher 138'. Interior coil springs within each guide will bias the discharge assistants into constant engagement with cam 126.

The pusher elements are connected to each other, and as best seen in FIG. 8 are gradually moved inwardly and outwardly by the cam 126 as the platforms rotate.

In operation, a uniform layer of material M is deposited on the platform 124 as it rotates at a constant rate beneath the dispensing end of the endless belt conveyor 16. As the turret rotates the cups 138 will gradually push the material adjacent their ends into the openings 131. As a container is positioned beneath each opening, the required amount of material by weight is dispensed therein.

In a general manner, while there has been disclosed in the above description, what is deemed to be the most practical and efficient embodiments of the invention, it should be well understood that the invention is not limited to such embodiments as there might be changes made in the arrangement, disposition and form of the parts without departing from the principle of the present in-

I claim:

1. A mechanism for accurately controlling by weight the rate of feed of a granulated material comprising in combination a support for said mechanism, a hopper for feeding at variable rates, a horizontal endless belt conveyor positioned beneath said hopper and driven at a constant speed, a framework to support said conveyor, said framework having a free end and a supported end, means pivotally supporting said supported end to said support, said means comprising at least one leaf spring connecting said support to said framework, and means maintaining said spring at an angle of less than 90° with respect to said framework, means to detect any pivotal movement of said framework, and a second means to continuously correct the amount of feed dispensed from said hopper by varying the feed rate of said hopper in response to a signal from said first mentioned means such that the conveyor will be maintained in its normal position by the continuous control of the amount of material being fed thereto.

2. A mechanism for accurately controlling by weight the rate of feed of a granulated material comprising in combination a support for said mechanism, a hopper for feeding at variable rates, an endless belt conveyor positioned beneath said hopper and driven at a constant speed, a framework to support said conveyor, said framework having a free end and a supported end, means pivotally supporting said supported end to said support, said means comprising at least one leaf spring connecting said support to said framework, and means maintaining said spring at an angle of less than 90° with respect to said framework, said last mentioned means comprising an inclined board pivotally adjustable on said support and means for affixing said leaf spring approximately perpendicularly to said board so that as the angle of inclination of said board is varied, said angle between said framework and said support is likewise varied, means to detect any pivotal movement of said framework, and a second means to continuously correct the amount of feed dispensed from said hopper by changing the vibratory characteristics of said hopper in response to a signal from said first mentioned means such that the conveyor will be maintained in its normal position by the continuous control of the amount of material being fed thereto.

3. A mechanism for accurately controlling the rate of feed of a granulated material comprising in combination, a hopper having a variable feed rate, an endless belt conveyor positioned beneath said hopper and driven at a constant speed, a framework supporting said conveyor, a pivot mounting for said framework on which the framework may pivot vertically about a normal position in response to the amount of material being fed to the conveyor from said hopper, an air pressure detecting mechanism for detecting any pivotal movement of said framework, said mechanism comprising a source of pneumatic power, a nozzle spaced closely adjacent said framework, a conduit for connecting said source to said nozzle for impinging a constant stream of air against said framework, means intermediate said source and said nozzle for accurately sensing the space between said nozzle and said framework by measuring the difference in pressure in said conduit caused by the proximity of said framework to said nozzle, and means for converting the difference in pressure sensed to an electrical signal which continuously changes the amount of material dispensed from said hopper by changing the rate of feed of said hopper in response to said signal whereby the conveyor will be maintained in its normal position by the continuous control of the amount of material being fed thereto.

4. A mechanism for accurately controlling the rate of feed of a granulated material comprising in combination, a vibrating hopper, an endless belt conveyor positioned beneath said hopper and driven at a constant speed, a pivot mounting for said conveyor on which the conveyor may pivotally deviate varying amounts from a normal position in response to the amount of material being fed to the conveyor from said hopper, an air pressure sensitive device to detect varying pivotal deviations of said conveyor from said normal position and, means to continuously change the amount of material dispensed from said hopper by varyingly changing the vibratory characteristics of said hopper in response to the detection from said air pressure sensitive device, such that the conveyor will be maintained in its normal position by the continuous control of the amount of material being fed thereto.

5. In combination with a variable vibrating feed hopper and a constant speed endless belt conveyor which is pivotally mounted at one end so that it pivots about a normal position in response to the amount of material fed to it by said hopper; a detection and control mechanism comprising, a source of pneumatic power, a nozzle, said conveyor being provided with a valve flange, and said nozzle mounted closely adjacent said flange but independent therefrom, said nozzle delivering a constant stream of air from said source to impinge on said flange, a first means associated with said nozzle responsive to changes in pressure within the nozzle caused by a movement of said flange from said normal position with respect to said nozzle for continuously varying the rate at which said feed hopper vibrates and discharges its material to said conveyor, whereby the conveyor will be caused to return to said normal position.

6. In combination with an assembly for accurately distributing by weight per unit of length, a layer of granular material along an endless belt conveyor, that further combination comprising a turret, means to rotate said turret at a constant speed, a standard for rotatably supporting said turret, a cam fixed to said turret, said turret comprising a first platform having its upper surface disposed along said cam, and a second platform spaced below said first platform, said first platform having a plurality of openings spaced about the periphery thereof, a plurality of elongated discharge assistants extending radially about said upper surface between said cam and said openings and having one end engaging said fixed cam, whereby when said platform is rotated said discharge assistants will be moved toward and away from said openings by said cam, the other ends of said discharge assistants being shaped in a manner so that any materials deposited on said first platform by said hopper will be pushed into said openings.

7. A packaging assembly comprising in combination, an endless belt conveyor mounted for pivotal movement about a normal position, a hopper for feeding a granular material to said conveyor, means responsive to a pivot movement of said conveyor to continuously adjust the feeding speed of said hopper such that the conveyor will be maintained in said normal position, and means causing a uniform layer of weight per unit of length of granular material to be continuously deposited on said conveyor, said conveyor having a discharge end, a circular platform having the periphery thereof spaced beneath said discharge end, means to rotate said platform at a constant speed, and further means on said platform to divide the material discharged by said conveyor into equal packageable increments comprising a cam, a plurality of discharge assistants radially arranged along said platform, said discharge assistants being moved by said cam as said platform is rotated, said platform having a plurality of openings about its periphery and normally spaced from said discharge assistants, whereby a uniform layer of material deposited in the space between said discharge assistants and openings will be deposited in equal increments into said openings as said cam causes said discharge assistants to approach said openings.

8. In combination, a variable rate vibrating conveyor adapted to receive a particulate material from bulk storage, a constant speed endless weighing conveyor adapted to receive a stream of particulate material from said vibrating conveyor and means operably connected between said weighing conveyor and said vibrating conveyor to incrementally adjust the rate of feed of the latter in an amount proportional to a weight signal produced by said weighing conveyor, said endless conveyor being mounted for pivotal movement about a pivot mounting means relative to a reference plane, the weight signal produced thereby being proportional to pivotal movement thereof relative to said reference plane and said adjusting means including means operable to continuously sense pivotal movement of said endless belt conveyor, said sensing means including a nozzle perpendicularly related to said endless belt conveyor at a spaced interval from said pivotal mounting means, a conduit in fluid communication with said nozzle and supplying said nozzle fluid under a predetermined pressure and pressure responsive means in fluid communication with said conduit and being operably connected with said vibrating conveyor, said endless conveyor upon pivotal movement relative to said reference plane varying the amount of flow through said nozzle from said conduit, thereby varying the pressure signal sensed by said pressure responsive means as a direct function of the pivotal movement of said endless conveyor from said reference plane.

9. The combination of claim 8 wherein said endless conveyor is pivotally mounted on a support base by at least one resilient leaf spring mounting means.

10. The combination of claim 9 wherein said endless conveyor has spaced from said resilient leaf spring mounting means a dampening means operatively interposed between said endless conveyor and its support base whereby pivotal movement of said endless conveyor is dampened.

11. A mechanism for controlling the rate at which a granular material is dispensed from a variable feed electrically controlled hopper comprising, in combination, a constant speed conveyor assembly adapted to receive material from said hopper, leaf springs pivotally supporting said assembly in a normal position when a set rate of material by weight is received by said conveyor, and pivotally responsive when said rate is changed, means to detect any pivotal movement from said normal position and continuously correct the rate at which said granular material is dispensed until said conveyor returns to its normal position, said means including a flange which follows the pivotal movement of said conveyor, a nozzle spaced near and directed toward said flange, and a conduit means for delivering pneumatic power to said nozzle, a member which has linear movement in response to changes in pressure in said conduit means, and a conversion means for converting said linear movement to an electrical signal for varying the rate of discharge of said hopper.

12. A mechanism for controlling the rate at which a granular material is dispensed from a variable feed electrically controlled hopper comprising, in combination, a constant speed conveyor assembly adapted to receive material from said hopper, leaf springs pivotally supporting said assembly in a normal position when a set rate of material by weight is received by said conveyor, and pivotally responsive when said rate is changed, means to detect any pivotal movement from said normal position and continuously correct the rate at which said granular material is dispensed until said conveyor returns to its normal position, said means including a plate which follows the movement of said conveyor, and means mounted near but independent from said plate, said means directing a stream of air against said plate, and an air pressure sensitive device for continually detecting changes in pressure in said means caused by any change in distance between said plate and said means, and a conversion means for converting said changes in pressure to an electrical signal to adjust the rate of discharge of said hopper.

References Cited in the file of this patent

UNITED STATES PATENTS

| | | |
|---|---|---|
| 2,206,237 | Roberts | July 2, 1940 |
| 2,273,330 | Robinson | Feb. 17, 1942 |
| 2,366,075 | Weyandt | Dec. 26, 1944 |
| 2,618,406 | Kast | Nov. 18, 1952 |
| 2,753,099 | Jenner et al. | July 3, 1956 |
| 2,889,030 | Mottet | June 2, 1959 |
| 2,917,207 | Prowse et al. | Dec. 15, 1959 |
| 2,920,794 | Bauder et al. | Jan. 12, 1960 |
| 2,951,514 | Flack | Sept. 6, 1960 |
| 2,990,937 | Goslin | July 4, 1961 |

FOREIGN PATENTS

| | | |
|---|---|---|
| 324,457 | Switzerland | Nov. 15, 1957 |

UNITED STATES PATENT OFFICE
CERTIFICATE OF CORRECTION

Patent No. 3,087,652                          April 30, 1963

Horace L. Smith, Jr.

It is hereby certified that error appears in the above numbered patent requiring correction and that the said Letters Patent should read as corrected below.

Column 2, line 66, for "pemit" read -- permit --; column 6, line 58, for "and" read -- said --.

Signed and sealed this 10th day of December 1963.

(SEAL)
Attest:
ERNEST W. SWIDER

Attesting Officer

EDWIN L. REYNOLDS

Acting Commissioner of Patents